3,540,962
METHOD OF EXTRUDING POLYETHYLENE ONTO AN ETHYLENE-HYDROLYZED VINYL ACETATE COPOLYMER
Haruyoshi Anzawa, Teiichiro Chiba, and Katsuaki Hirano, Kurashiki, Japan, assignors to Kurashiki Rayon Co., Ltd., Kurashiki-shi, Okayama Prefecture, Japan, a corporation of Japan
No Drawing. Filed Sept. 22, 1965, Ser. No. 489,409
Claims priority, application Japan, Oct. 3, 1964, 39/56,128
Int. Cl. B32b 27/08, 3/02
U.S. Cl. 156—244      3 Claims

ABSTRACT OF THE DISCLOSURE

A method for producing a heat-sealable wrapping material is claimed. The material consists essentially of a base film of saponified ethylene-vinyl acetate copolymer containing from about 20 to 70 mole percent of ethylene and a saponification degree of at least about 90 mole percent, coated on at least one side with a film. The surface of the film layer applied to the base film is oxidized, e.g. in air at elevated temperatures, before being applied to the base film.

---

This invention relates to a film of saponified ethylene-vinyl acetate copolymer coated with polyethylene and a method for producing the same.

The object of the invention is to provide a novel heat-sealable wrapping material characterized by good moisture resistance, gas-, oil- and fat-impermeability, flavor-retaining properties, processability in mechanical bag-making, and satisfactory adhesion to a coating layer.

Properties required of wrapping material, in particular for foodstuffs, may be considered to include the following:

Moisture-proofness (for preventing the wrapped material from being decomposed or denatured by water which may otherwise penetrate through the wrapping).

Gas-impermeability (for preventing oxidation of wrapped oil and fat articles, with oxygen from the outside of the wrapping and for preventing dissipation of the original flavor of the wrapped contents).

Cold resistance (for retaining the flexibility of the film while stored in refrigerators).

Chemical resistance (for stabilizing the film against corrosive attack by acids and alkalis).

Surface luster, transparency, and printability (for giving the wrapped package a fine appearance, and making the contents visible through the wrapping film so as to enhance the merchandise value of the wrapped article).

Mechanical strength (for enabling the wrapping material to be mechanically formed into bags and for protecting the wrapping from damage during transportation or otherwise).

Heat sealability (for permitting the wrapping material to be readily sealed by conventional heat sealers, and to acquire sufficient seal strength for practical use).

Non-chargeability (for preventing the wrap surface from being statically charged and thereby stained with dirt).

Since these requirements are not satisfactorily met by mono-layer films, polyethylene-laminate cellophane, so called because it consists of viscose cellophane coated on one side with polyethylene, has been in use most extensively as a transparent wrapping material. The combination of cellophane and polyethylene takes advantage of the machinability, printability, fine appearance, gas-, oil-, and fat-impermeability characteristics of cellophane, and also of the moisture-proof, cold-proof, water-proof, and chemical-resisting properties as well as great tear strength of polyethylene. Moreover, the advantages of one constituent offset the defects of the other and vice versa. Nevertheless, the polyethylene-coated film has a fundamental disadvantage. Its properties and performance as a wrapping material are seriously affected by moisture. The cellophane constituent of the film combination is highly hygroscopic, and swells at a high ambient temperature and humidity, particularly in summer, and loses its bonding strength with the polyethylene layer until it separates itself from the polyethylene layer or loses much of the gas impermeability even if it remains unexfoliated. When the ambient temperature is low, as in winter, the tearing strength drops and the film is sometimes torn in the course of printing or machining into bags, overwraps, etc.

In order to eliminate the aforementioned disadvantages of cellophane-polyethylene layered films, a moisture-proof layer is often provided the side of the cellophane film layer opposite the side coated with the layer of polyethylene. These modified films are often referred to as polyethylene-coated moisture-proof cellophanes. In practice, however, the effect of the moisture-proof layer is limited when the combined film is used in wrapping goods, as the moisture-proof layer tends to be damaged by creases, scratches and the like caused by uneven coating, or by handling in the course of printing, bag-making, packaging, and transportation.

Another disadvantage of polyethylene-coated cellophane film lies in the complexity of the process of manufacturing the product. Since the bond provided between a base film of viscose cellophane and polyethylene is inadequate, the cellophane surface must usually be coated with an adhesion promoter such as organic titanic ester prior to the coating with polyethylene. Use of an adhesion promoter often presents problems of flammability, toxicity and staining of a printed surface. Also, employment of adhesion promoters in commercial production is economically disadvantageous.

It has now been found that a base film of saponified ethylene-vinyl acetate copolymer, coated with polyethylene in accordance with the present invention, provides a heat-sealable composite film which overcomes all the foregoing difficulties of the conventional transparent films. The base film of saponified ethylene-vinyl acetate copolymer of the invention is characterized by remarkably good adhesion to the polyethylene coating and by only limited moisture sensitivity. In addition, the saponified ethylene-vinyl acetate copolymer base film of the invention has been found to be equal to or even superior to cellophane in such properties as transparency, surface luster, machanical strength, impermeability to oxygen, nitrogen, carbonic acid gas, organic vapor, and to oil and fat and printability. Thus, coating the base film with a film layer of polyethylene provides a composite film which not only has all the advantages of cellophane-polyethylene composite films but in addition is greatly improved with respect to moisture resistance, bond strength between layers and other properties. Consequently, the composite films of the invention find particular utility as wrapping materials in the packaging of foodstuffs and medicines which require a high degree of moisture resistance.

The saponified ethylene-vinyl acetate copolymer constituting the base film of the composite film of the invention contains from about 20 to 70 mole percent and possesses a degree of saponification of at least about 90 mole percent of the acetic acid groups are converted to hydroxyl groups. A saponified ethylene-vinyl acetate copolymer having an ethylene content of less than about 20 mole percent has poor water-proofing and moisture-proofing qualities. A copolymer containing more than about 70 mole percent of ethylene, on the other hand, has less impermeability against gas, oil and fat, and a low softening point that makes heat sealing of the product difficult and provides a base which tends to be fused in the course of coating with polyethylene. A saponification degree of less than about 90 mole percent is not recommended because the product will have very poor resistance to water and moisture. Saponified ethylene-vinyl acetate copolymers are described in U.S. Pat. Nos. 2,386,347 and 3,183,203 and British Pat. No. 634,140, incorporated herein by reference.

The heat-sealable wrapping material or composite of the invention can be obtained by coating at least one side of the saponified ethylene-vinyl acetate copolymer base film with molten polyethylene extruded as a film onto the base film and bonding the two film layers while the surface of the extruded polyethylene is at an elevated temperature sufficient for melting, for instance, at least about 250° C. up to say about 340° C. Temperatures over 340° C. are usually avoided since they may cause degradation of the polyethylene. Also, the extruded polyethylene while in the molten state is permitted to contact air for at least 0.2 second before application and bonding to the base film of ethylene-vinyl acetate copolymer. Any of the film-forming grades of polyethylene can be employed and frequently these polyethylenes have a density of about 0.90 to 0.96.

The usual extrusion coating apparatus can be employed in the method of the invention and the extrusion can be carried out either as a batch or continuous operation. Thus, in accordance with the method of the invention, the cylinder and die temperatures of the extruder can be set so that the molten polyethylene extruded as a film has a surface temperature of from about 250 to 340° C., preferably from about 295 to 330° C., immediately after leaving the die lips. The film of molten polyethylene extruded through the die lips is allowed to pass through air for a period of at least about 0.02 second, and then is pressed against and bounded to a base film of the saponified copolymer of ethylene and vinyl acetate by a cooling roll and pressure roll of a laminator. The laminate of polyethylene and saponified copolymer so formed is simultaneously cooled by the cooling roll.

To obtain proper bonding it is important that the molten polyethylene have a surface temperature of at least about 250° C. and that the distance between the die lips and the contact area between the cooling roll and pressure roll be sufficient to permit the molten polyethylene which has left the die lips to be in contact with air for at least about 0.02 second in order to oxidize the polyethylene surface. At these elevated temperatures and contact times the surface of the ordinarily non-polar polyethylene is oxidized on contact with air, the oxidation increasing the polarity of the polyethylene and consequently its adhesion to the base film. Contact with air for periods longer than about 2 seconds will not increase the adhesive effect of polyethylene and is usually avoided because prolonged exposure to air will lower the temperature of the melt.

The bonding strength of the polyethylene coating layer and the base film coated in the foregoing manner is very great. If desired, the base film of saponified copolymer may also contain a pigment, lubricant, stabilizer, or other suitable additives. Similarly, the coating layer of polyethylene may contain a pigment, lubricant, stabilizer, or other additives. For improvement in dimensional stability and moisture resistance, the base film may be subjected to heat treatment before or after stretching. This again has no adverse effect on coating of the film with an extruded melt of polyethylene.

In coating films of cellophane, polyvinyl chloride, polyvinylidene chloride, polyethylene terephthalate, and the like with an extruded melt of polyethylene, it is indispensable to use an adhesion promoter such as organic titanic ester in order to acquire a sufficient bonding strength. By contrast, the base film of the present invention provides adequate bonding strength in the absence of adhesion promoters, which feature is one of the major advantages of the invention.

In cases, however, where even greater adhesivity is desired or where sufficient bonding strength is desired with a relatively low extrusion temperature of polyethylene, such bonding promoters may be used. Use of an adhesion promoter such as organic titanic ester will result in much greater bonding strength than that obtained by polyethylene-coated cellophane containing the same organic titanic ester. Organic titanic esters useful in the present invention for readily increasing the bonding strength include the alkyl titanates such as tetraisopropyl titanate, tetrastearyl titanate, mixtures of tetraisopropyl titanate and tetrastearyl titanate, polydibutyl titanate, and titanium acetylacetonate.

The invention is further illustrated by the following examples.

In the examples, the intrinsic viscosity $[\eta]$ of the saponified ethylene-vinyl acetate copolymer is a value measured at 30° C. in a phenol solution containing 15 percent by weight of water. The melt index (M.I.) of polyethylene was determined in conformity to ASTM D1238–52T (E), bonding strength was determined in conformity to JIS (Japanese Industrial Standards) Z–1514, moisture permeability to JIS–Z0208, and tearing strength to JIS–1702.

EXAMPLE 1

To a saponified ethylene-vinyl acetate copolymer having an ethylene content of 40.1 mole percent, a saponification degree of 98.2 mole percent, and an intrinsic viscosity of 0.10 l./g., was added calcium stearate in an amount of 0.5 percent by weight of the total amount of the copolymer. The mixture was pelletized and the resulting pellets were extruded by a 40 mm.-diameter extruder equipped with a flat die, at a cylinder temperature of from 160 to 170° C. and a die temperature of 175° C., into a base film 0.02 mm. in thickness. A low-density polyethylene having a density of 0.921 g./cm.$^3$ and melt index of 7.0 was extruded into a film by means of an extruder maintained at an extruder cylinder temperature of from 200 to 320° C. and an extruder die temperature of 320° C. A distance of about 5 cm. was kept between the die lips and the contact point of the cooling roll and the coating film of polyethylene was fed at a rate of 6 meters per minute into the clearance between the pressure rubber roll and the cooling roll to bond the polyethylene film to one side of said base film.

The bonding strength, moisture permeability, degree of swelling in water, tearing strength, breakdown strength, and outward appearance of the coated film thus obtained are shown in Table 1. The coated film thus obtained was found to be superior to polyethylene-laminate cellophane currently in use, with respect to moisture resistance gas permeability at elevated humidity, flexibility at low temperatures, tearing strength at a low humidity, etc. and was not inferior in other properties such as outward appearance, printability and workability for bag-making.

By way of comparison, base films of polyvinylidene chloride, non-plasticized polyvinyl chloride, polyethylene terephthalate, and ordinary cellophane were individually coated with an extruded melt of polyethylene, but the resulting laminates had so poor bonding strength that they were not suitable for practical applications. The properties of a composite film of polyethylene-coated cellophane are given in Table 1 as those of Control 1.

EXAMPLE 2

To a saponified ethylene-vinyl acetate copolymer of the same composition as in Example 1 was added 0.5 percent calcium stearate and the mixture pelletized. The resulting pellets were extruded into a film under the same procedure and conditions described in Example 1. The film was then heat treated at 120° C. for 60 seconds to obtain a base film, 0.02 mm. in thickness. The base film was continuously coated with polyethylene by the same procedure described in Example 1. The composite film thus obtained had good moisture resistance and satisfactory physical and mechanical strength as shown in Table 1.

EXAMPLE 3

A saponified ethylene-vinyl acetate copolymer having an ethylene content of 60.5 mole percent, a saponification degree of 98.1 mole percent, and an intrinsic viscosity [$\eta$] of 0.086 l./g., was subjected to the same procedure as described in Example 1, and a laminate of the base film of said saponified copolymer coated with a polyethylene layer was obtained. The composite film had good outward appearance, physical and mechanical strength, and moisture resistance. The properties are shown in Table. 1.

EXAMPLE 4

The saponified ethylene-vinyl acetate copolymer used in Example 3 was extruded into a film, which was then heat treated at 100° C. for 60 seconds to form a 0.02 mm.-thick film. The resulting film was coated with molten polyethylene extruded thereon in accordance with the procedure of Example 1. The base film of saponified ethylene-vinyl acetate copolymer thus laminated with polyethylene had good moisture resistance, outward appearance and strength, as shown in Table 1.

EXAMPLE 5

Pellets of a saponified ethylene-vinyl acetate copolymer having an ethylene content of 50.0 mole percent, a saponification degree of 97.8 mole percent, and an intrinsic viscosity of 0.085 l./g. were extruded by a 40 mm.-diameter extruder equipped with a flat die, at a cylinder temperature of 160 to 170° C. and a die temperature of 175° C., into a film having a thickness of 0.02 mm. On one side of the film, a 3 percent xylene solution of an organic titanic ester (a mixture of tetraisopropyl) titanate and tetrastearyl titanate in a weight ratio of 3:1) was applied, and the film dried and activated.

Next, the treated surface was coated with molten polyethylene extruded at an average temperature of 280° C., and a filming speed of 4 meters per minute. The distance between the die lips and the contacting point of the cooling and pressure rolls was about 4 cm. The properties of the coated film thus obtained (hereinafter referred to as the specimen A) are as shown in Table 1. The film exhibited great bonding strength and excellent moisture resistance and physical and mechanical strength.

For the purpose of comparison, cellophane was treated with the same organic titanic ester in like manner, and then coated with molten polyethylene extruded thereon at an average temperature of 300° C. to provide a polyethylene-coated cellophane film having a thickness of 0.02 mm. (This specimen is hereinafter referred to as specimen B.) The films A and B were dipped in water at a room temperature for 4 days, and their bonding strength values before and after the dipping were determined. The results are given in Table 2. The properties of specimen B are also given in Table 1 as those of Control 2.

From the data of Table 1, the excellent bonding strength attained between the saponified copolymer of the invention and polyethylene is readily seen.

EXAMPLE 6

The non-coated surface of the saponified copolymer film prepared and coated with polyethylene on one side as described in Example 1, was coated with a film of polyethylene 0.02 mm. thick by melt extrusion according to the same procedure of Example 1. The properties of the multi-layer film having polyethylene coating layers on both sides are shown in Table 1. The impermeability to gas, oil and fat, which characterizes the saponified copolymer was thus added to the properties of polyethylene.

TABLE 1

| Example No. | Thickness of coating layer (mm.) | Bonding strength [1] (at 20° C. and 65% RH) (g./15 mm.) | Water vapor transmission rate (at 40° C. and 90% RH) | | Degree of swelling in water, by weight at 30° C. for 24 hrs.) | Tearing Strength (at 20° C. and 40% RH) | | Breakdown strength (at −10° C.) (No. of bends) | Outward appearance | Remarks | Ethylene content, molar percent |
|---|---|---|---|---|---|---|---|---|---|---|---|
| | | | PE High humidity side (g./m.²/ 24 hr.) | PE Low humidity side (g./m.²/ 24 hr.) | | Longitudinal, kg./mm. | Lateral, kg./mm. | | | | |
| 1 | 0.02 | 388 | 14.3 | 22.3 | 3.78 | 2.5 | 2.4 | 2,000–10,000 | Good | | 40.1 |
| 2 | 0.02 | [1] 381 | 12.4 | 19.8 | 2.13 | 2.0 | 2.0 | 2,000–10,000 | ...do... | 120° CH.T. | 40.1 |
| 3 | 0.02 | [1] 379 | 10.1 | 19.5 | 2.32 | 5.3 | 5.4 | 2,000–10,000 | ...do... | | 60.5 |
| 4 | 0.02 | [1] 378 | 8.6 | 18.0 | 1.77 | 4.8 | 4.8 | 2,000–10,000 | ...do... | 100° CH.T. | 60.5 |
| 5 | 0.02 | [1] 415 | 12.5 | 20.7 | 2.75 | 3.8 | 3.7 | 2,000–10,000 | ...do... | [2] | 50.0 |
| 6 | 0.04 | [1] 385 | 7.0 | | 0 | 8.0 | 8.1 | 2,000–10,000 | ...do... | [3] | 40.1 |
| Control 1 | 0.02 | 65 | 20.1 | 27.3 | 39.3 | 1.7 | 1.8 | 1,000–4,500 | ...do... | [4] | [4] |
| Control 2 | 0.02 | 212 | 20.2 | 27.5 | 38.5 | 1.7 | 1.7 | 1,000–4,500 | ...do... | [5] | [5] |

[1] In bonding strength, the values with ([1]) mean films one of whose layers was torn off during the test.
[2] Treated with titanate.
[3] Coated on both sides with PE.
[4] PE/cellophane not treated.
[5] PE/cellophane treated with titanate.

NOTE.—PE=polyethylene.

TABLE 2

| | Bonding strength | |
|---|---|---|
| | Before dipping (g./15 mm.) | After dipping (g./15 mm.) |
| Specimen: | | |
| A | [1] 415 | [1] 410 |
| B | 212 | 90 |

[1] One of the component films (in this case the polyethylene film) was torn off.

The embodiments of the invention in which an exclusive property or privilege is claimed are defined as follows:

1. A method of producing a heat-sealable laminated wrapping material for foodstuffs and medicines, said material being characterized by substantial gas-impermeability and which comprises extruding a molten polyethylene film with a surface temperature of about 250 to 340° C., contacting said polyethylene film while in the molten state with air for a period of time sufficient to oxidize the surface of the film, and bonding said polyethylene film onto a base film of saponified ethylene-vinyl acetate copolymer containing from about 20 to 70 mole percent of ethylene and having a saponification degree of at least about 90 mole percent and which base film has been heat-treated at a temperature of at least about 100° C. to improve the dimensional stability and moisture resistance of said base film.

2. A method as defined in claim 1, wherein the surface temperature of the extruded polyethylene film is about 295° to 330° C.

3. A method as defined in claim 1, wherein said base film is treated with a titanate ester to promote adhesion.

References Cited

UNITED STATES PATENTS

| | | | |
|---|---|---|---|
| 2,386,347 | 10/1945 | Roland | 260—87.3 |
| 3,002,854 | 10/1961 | Brill | 117—161 |
| 3,025,167 | 3/1962 | Butler | 99—171 |
| 3,114,736 | 12/1963 | Bartl et al. | 260—87.3 |
| 3,223,761 | 12/1965 | Raley | 264—95 |
| 2,909,443 | 10/1959 | Wolinski | 161—254 |
| 3,190,781 | 6/1965 | Metz | 156—244 |
| 3,076,720 | 2/1963 | Rice et al. | 117—15 |

ROBERT F. BURNETT, Primary Examiner

R. J. ROCHE, Assistant Examiner

U.S. Cl. X.R.

161—254; 99—171; 117—138.8